(12) United States Patent
Nakano et al.

(10) Patent No.: US 10,798,970 B2
(45) Date of Patent: Oct. 13, 2020

(54) CHARGING DEVICE FOR NON-COMBUSTION TYPE FLAVOR INHALER

(71) Applicant: JAPAN TOBACCO INC., Tokyo (JP)

(72) Inventors: Takuma Nakano, Tokyo (JP); Akihiko Suzuki, Tokyo (JP); Manabu Takeuchi, Tokyo (JP); Manabu Yamada, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 235 days.

(21) Appl. No.: 15/683,329

(22) Filed: Aug. 22, 2017

(65) Prior Publication Data

US 2017/0347718 A1    Dec. 7, 2017

Related U.S. Application Data

(63) Continuation of application No. PCT/JP2015/056571, filed on Mar. 5, 2015.

(51) Int. Cl.
| | | |
|---|---|---|
| A24F 47/00 | (2020.01) | |
| H02J 7/00 | (2006.01) | |
| H02J 7/02 | (2016.01) | |
| H02J 50/10 | (2016.01) | |

(52) U.S. Cl.
CPC ............. *A24F 47/008* (2013.01); *A24F 47/00* (2013.01); *H02J 7/00* (2013.01); *H02J 7/0042* (2013.01); *H02J 7/025* (2013.01); *H02J 50/10* (2016.02)

(58) Field of Classification Search
CPC ....... A24F 47/008; A24F 47/00; A61M 15/06; A01N 43/40; A01N 43/56; H02J 7/00; H02J 7/025; H02J 7/0042; H02J 7/0044; H02J 50/10; H02J 5/005
See application file for complete search history.

(56) References Cited

U.S. PATENT DOCUMENTS

| | | | |
|---|---|---|---|
| 2011/0265806 A1 | 11/2011 | Alarcon et al. | |
| 2013/0298922 A1 | 11/2013 | Xiang et al. | |
| 2013/0300350 A1* | 11/2013 | Xiang ................. | A24F 47/00 320/108 |
| 2014/0014124 A1* | 1/2014 | Glasberg ............. | A24F 47/008 131/328 |
| 2014/0020697 A1 | 1/2014 | Liu | |
| 2016/0051776 A1* | 2/2016 | Von Hollen ........ | A61M 15/0026 128/200.23 |

FOREIGN PATENT DOCUMENTS

| | | |
|---|---|---|
| EP | 2573900 A1 | 3/2013 |
| JP | 2006-314181 A | 11/2006 |

(Continued)

OTHER PUBLICATIONS

Japanese Office Action and English translation dated Feb. 27, 2018 for Application No. 2017-503302.

(Continued)

*Primary Examiner* — Sibin Chen
(74) *Attorney, Agent, or Firm* — Birch, Stewart, Kolasch & Birch, LLP

(57) ABSTRACT

A charging device for a non-combustion type flavor inhaler includes a housing having an electric contact with a non-combustion type flavor inhaler including a rechargeable battery; a power reception unit configured to receive electric power in a non-contact state from a power feeding unit included in a power feeding member; and a charging unit configured to supply the electric power received in the power reception unit to the rechargeable battery via the contact.

8 Claims, 3 Drawing Sheets

(56) References Cited

FOREIGN PATENT DOCUMENTS

| JP | 2010-98861 A | 4/2010 | | |
|---|---|---|---|---|
| JP | 2013-524835 A | 6/2013 | | |
| JP | 2014-504142 A | 2/2014 | | |
| WO | WO 2014/015463 A1 | 1/2014 | | |
| WO | WO 2014/125479 A1 | 8/2014 | | |
| WO | WO 2014/144802 A1 | 9/2014 | | |
| WO | WO-2014144802 A1 * | 9/2014 | ........... | A24F 47/008 |

OTHER PUBLICATIONS

Office Action issued in Eurasian Patent Application No. 201791944, dated Apr. 2, 2019.
Korean Office Action, dated Mar. 28, 2019, for Korean Application No. 10-2017-7022341, with an English translation.
International Search Report for PCT/JP2015/056571 (PCT/ISA/210) dated Jun. 2, 2015.
Taiwanese Office Action dated Feb. 16, 2017, for corresponding Taiwanese Application No. 104143537, with English translation.
Australian Examination Report No. 2, dated Mar. 15, 2019, for Australian Application No. 2015384974.
Korean Office Action, dated Aug. 16, 2018, for Korean Application No. 10-2017-7022341, with an English translation.
Australian Examination Report No. 1, dated Jun. 21, 2018, for Australian Application No. 2015384974.
Extended European Search Report, dated Jul. 4, 2018, for European Application No. 15883980.3.

* cited by examiner

CHARGING DEVICE FOR NON-COMBUSTION TYPE FLAVOR INHALER

CROSS REFERENCE TO RELATED APPLICATIONS

This application is a Continuation of PCT International Application No. PCT/JP2015/056571, filed on Mar. 5, 2015, which is hereby expressly incorporated by reference into the present application.

TECHNICAL FIELD

The present invention relates to a charging device for a non-combustion type flavor inhaler which device is to charge a rechargeable battery provided in the non-combustion type flavor inhaler.

BACKGROUND ART

Conventionally, a non-combustion type flavor inhaler including a rechargeable battery and driven by electric power supplied by the rechargeable battery is known. Also, as a method of charging a rechargeable battery provided in a non-combustion type flavor inhaler, a method of charging a rechargeable battery in a non-contact state (non-contact power feeding system) is proposed. More specifically, a non-combustion type flavor inhaler includes a power reception unit that receives electric power in a non-contact state from a power transmission unit included in a charging device (for example, Patent Literatures 1 and 2).

CITATION LIST

Patent Literature

Patent Literature 1: WO 2014/125479 A
Patent Literature 2: WO 2014/015463 A

SUMMARY

A first feature is summarized as a charging device for a non-combustion type flavor inhaler, comprising: a housing having an electric contact with a non-combustion type flavor inhaler including a rechargeable battery; a power reception unit configured to receive electric power in a non-contact state from a power feeding unit included in a power feeding member; and a charging unit configured to supply the electric power received in the power reception unit to the rechargeable battery via the contact.

A second feature is summarized as the charging device for a non-combustion type flavor inhaler according to the first feature, wherein the housing is configured to hold an end part of the non-combustion type flavor inhaler which has a rod shape extending in a predetermined direction.

A third feature is summarized as the charging device for a non-combustion type flavor inhaler according to the second feature, wherein in a case where the charging device is placed on the power feeding member, an area in which the charging device is in contact with the power feeding member is smaller than an area of a projected part acquired by projection of the non-combustion type flavor inhaler onto a plane perpendicular to a direction orthogonal to the predetermined direction.

A fourth feature is summarized as the charging device for a non-combustion type flavor inhaler according to any one of the first feature to the third feature, further comprising a communication interface configured to communicate with the non-combustion type flavor inhaler and an external device.

A fifth feature is summarized as the charging device for a non-combustion type flavor inhaler according to the fourth feature, wherein the communication interface includes a connection terminal to communicate with the non-combustion type flavor inhaler in a state in which the non-combustion type flavor inhaler is held by the housing.

A sixth feature is summarized as the charging device for a non-combustion type flavor inhaler according to the fourth feature or the fifth feature, wherein the communication interface is configured to acquire information related to the non-combustion type flavor inhaler from the non-combustion type flavor inhaler in a state in which the non-combustion type flavor inhaler is held by the housing.

DESCRIPTION OF EMBODIMENTS

Next, an embodiment will be described. Note that, the same or similar portions are denoted with the same or similar reference signs in the descriptions of the drawings below. Note that, the drawings are schematic and a ratio of each size is different from a real one.

Therefore, specific sizes and the like should be judged in consideration of the following descriptions. Needless to say, portions of which relationship and ratios of mutual sizes are different between the mutual drawings, are included.

Outline of Embodiment

In the above-described background art, it is necessary for a non-combustion type flavor inhaler to include a power reception unit, and thus, a size of the non-combustion type flavor inhaler is increased. Since the non-combustion type flavor inhaler is a device that a user uses in hand, the increase in the size of the non-combustion type flavor inhaler is not preferable.

A charging device for a non-combustion type flavor inhaler according to an embodiment includes: a housing having an electric contact with a non-combustion type flavor inhaler including a rechargeable battery; a power reception unit to receive electric power in a non-contact state from a power feeding unit included in a power feeding member; and a charging unit to supply the electric power received in the power reception unit to the rechargeable battery via the contact.

In the embodiment, in a case where a non-contact power feeding system is applied to a non-combustion type flavor inhaler, it is possible to take advantage of the non-contact power feeding while controlling an increase in a size of the non-combustion type flavor inhaler by using a charging device including a power reception unit without providing a power reception unit in the non-combustion type flavor inhaler.

Embodiment (Application Scene)

Figure 1:
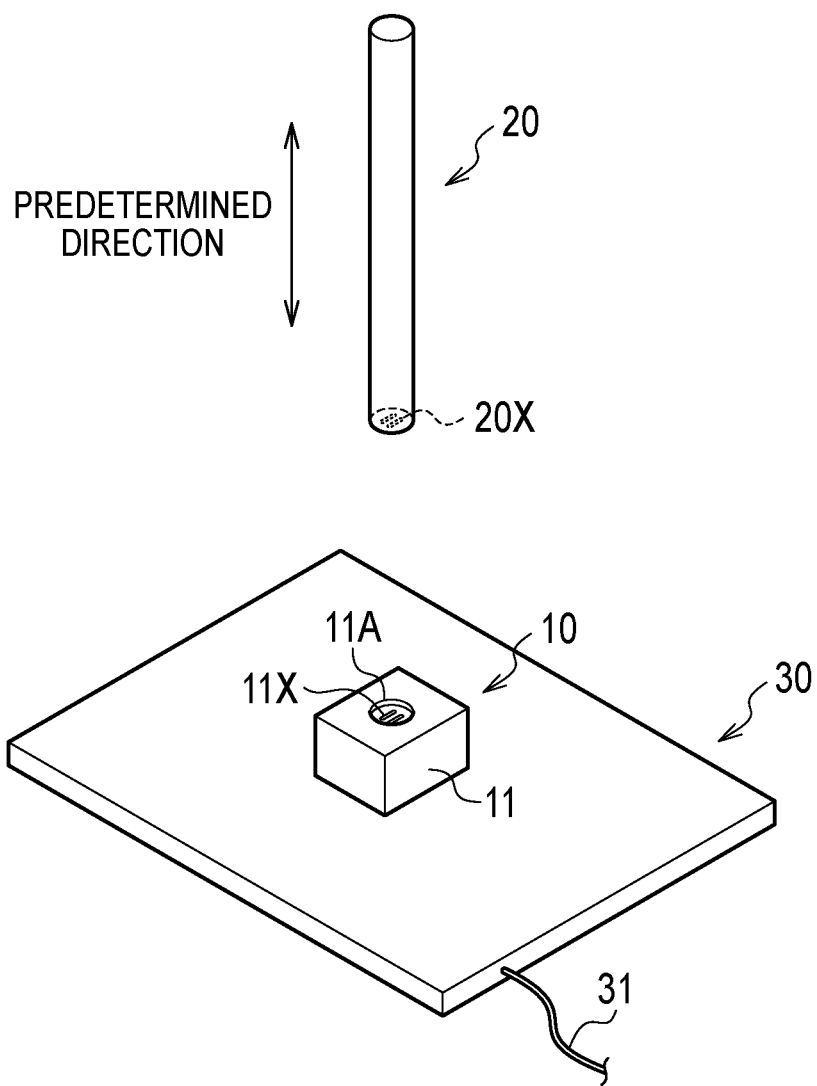
FIG. 1 is a diagram for describing an application scene of a charging device 10 according to an embodiment.

In the following, an application scene of a charging device according to the embodiment will be described. FIG. 1 is a diagram for describing an application scene of a charging device 10 according to the embodiment.

As illustrated in FIG. 1, the charging device 10 is used together with a non-combustion type flavor inhaler 20 and a power feeding member 30.

The charging device 10 is a device to charge a rechargeable battery provided in the non-combustion type flavor inhaler 20 by using electric power received from the power feeding member 30 in a non-contact state. More specifically, the charging device 10 includes a housing 11 having an electric contact with the non-combustion type flavor inhaler 20.

In the embodiment, the housing 11 holds an end part of the non-combustion type flavor inhaler 20 having a rod shape extending in a predetermined direction. More specifically, an upper surface of the housing 11 has a recess 11A to hold the end part of the non-combustion type flavor inhaler 20. A bottom surface of the recess 11A includes an electrode 11X that configures an electric contact with the non-combustion type flavor inhaler 20. It should be noted that the electrode 11X is exposed at the bottom surface of the recess 11A. However, the embodiment is not limited to this. For example, an electric contact may be provided on a side surface of the end part of the non-combustion type flavor inhaler 20 and a side surface of the recess 11A.

The non-combustion type flavor inhaler 20 includes a rechargeable battery and is driven by electric power accumulated in the rechargeable battery. The end part of the non-combustion type flavor inhaler 20 is held by the recess 11A of the housing 11 as described above. The end part of the non-combustion type flavor inhaler 20 includes an electrode 20X that configures an electric contact with the charging device 10. That is, the electric contact between the charging device 10 and the non-combustion type flavor inhaler 20 is configured by the electrode 11X and the electrode 20X.

For example, the non-combustion type flavor inhaler 20 includes an atomization unit to atomize an aerosol source without combustion. The atomization unit may be a heating type to atomize an aerosol source by heating or an ultrasonic type to atomize an aerosol source by an ultrasonic wave.

The power feeding member 30 is a member to feed electric power to the charging device 10 in a non-contact state. The power feeding member 30 includes a power cable 31. The power cable 31 may be a cable for connection to an AC power supply and may be a universal serial bus (USB) cable.

In the embodiment, the power feeding member 30 has a sheet shape and includes a power feeding unit to feed electric power to a device placed on the power feeding member 30. That is, it should be noted that electric power can be fed to a device other than the charging device 10 as long as the device placed on the power feeding member 30 includes a power reception unit.

In the embodiment, it is preferable that the electrode 11X and the electrode 20X have magnetism attracting each other. Accordingly, even when the depth of the recess 11A of the housing 11 is shallow, the recess 11A of the housing 11 can hold the end part of the non-combustion type flavor inhaler 20.

(Function Block)

Figure 2:
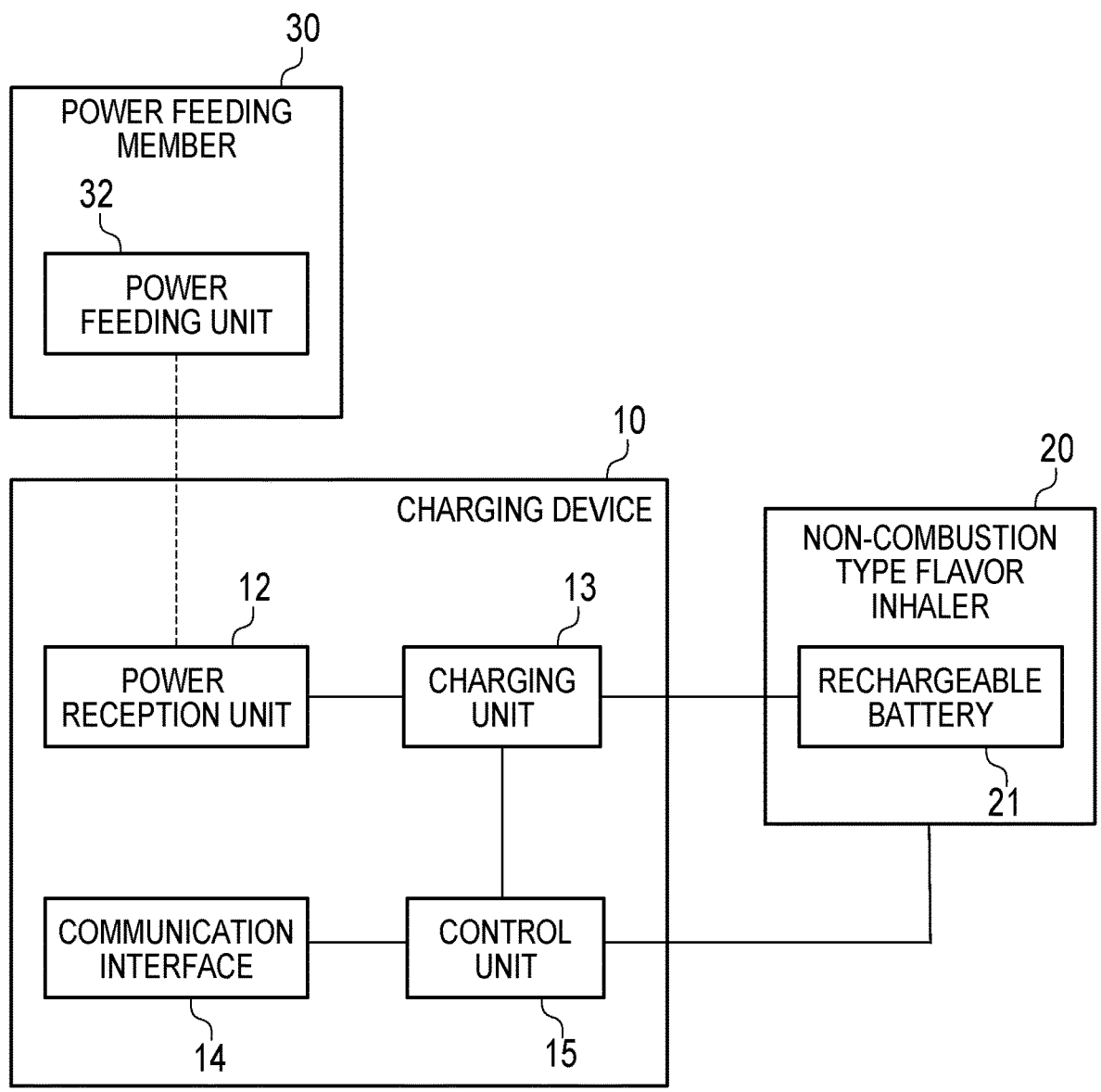
FIG. 2 is a diagram for describing a function block of the charging device 10 according to the embodiment.

In the following, a function block of the charging device according to the embodiment will be described. FIG. 2 is a diagram for describing a function block of the charging device 10 according to the embodiment.

As illustrated in FIG. 2, the charging device 10 includes a power reception unit 12, a charging unit 13, a communication interface 14, and a control unit 15. Note that the power reception unit 12 and the charging unit 13 are provided in the housing 11.

The power reception unit 12 receives electric power in a non-contact state from the power feeding unit 32 included in the power feeding member 30. For example, the power reception unit 12 includes a power reception coil or the like to generate electromagnetic induction and to pass an induced current generated by the electromagnetic induction in a state in which the charging device 10 (power reception unit 12) is close to the power feeding member 30 (power feeding unit 32).

The charging unit 13 supplies electric power received in the power reception unit 12 to a rechargeable battery 21 via an electric contact between the charging device 10 and the non-combustion type flavor inhaler 20 (electrode 11X and electrode 20X).

The communication interface 14 includes a first interface and a second interface.

The first interface is an interface to communicate with an external device such as a personal computer or a smartphone. The first interface may include a wireless module to perform wireless communication (such as module conforming to IEEE 802.11a/b/g/n or the like) or may include a wired module to perform wired communication (such as module conforming to USB).

The second interface is an interface to communicate with the non-combustion type flavor inhaler 20. Although not being specifically limited, the second interface preferably includes a connection terminal to communicate with the non-combustion type flavor inhaler 20 (control unit 15) in a state in which the non-combustion type flavor inhaler 20 is held by the recess 11A of the housing 11 (that is, in charged state). Here, the second interface performs communication via a communication path formed between the charging device 10 and the non-combustion type flavor inhaler 20. The communication path may be formed, for example, by utilization of an electric contact between the charging device 10 and the non-combustion type flavor inhaler 20 (electrode 11X and electrode 20X). Alternatively, the communication path may be formed by utilization of a connection terminal provided separately from the electric contact (electrode 11X and electrode 20X). Similarly to the electrode 11X and the electrode 20X, the connection terminal may be provided at the bottom surface of the recess 11A of the charging device 10 and the end part of the non-combustion type flavor inhaler 20. That is, the connection terminal included in the second interface may be the electrode 11X or a terminal provided separately from the electrode 11X.

The control unit 15 controls the charging device 10. For example, in a charging state, the control unit 15 may acquire information related to the non-combustion type flavor inhaler 20 (such as status of non-combustion type flavor inhaler 20 (such as beginning period of utilization, number of time of puffing, and life of aerosol source)) from the non-combustion type flavor inhaler 20 through the second interface. The control unit 15 may transmit the information acquired from the non-combustion type flavor inhaler 20 to an external device through the first interface. Alternatively, the control unit 15 may acquire information that the non-combustion type flavor inhaler 20 is to be notified of (such as data for updating software of non-combustion type flavor inhaler 20) from an external device through the first interface. In the charging state, the control unit 15 may transmit the information acquired from the external device to the non-combustion type flavor inhaler 20 through the second interface.

Furthermore, the control unit 15 monitors the charging unit 13 and may acquire information related to the non-combustion type flavor inhaler 20 (such as amount of charge or number of time of charging). The control unit 15 may transmit the acquired information to an external device through the first interface.

In such a case, timing of acquiring information from the non-combustion type flavor inhaler 20 or timing of acquiring information in the non-combustion type flavor inhaler 20 may be timing at which the non-combustion type flavor inhaler 20 is held by the charging device 10 (that is, timing of starting charging) or timing of ending charging. Alternatively, the timing of acquiring information from the non-combustion type flavor inhaler 20 may be timing instructed by an external device.

Similarly, timing of acquiring information from an external device or timing of transmitting information to an external device may be timing at which the non-combustion type flavor inhaler 20 is held by the charging device 10 (that is, timing of starting charging) or timing of completing charging. Alternatively, the timing of acquiring information from the non-combustion type flavor inhaler 20 may be timing instructed by an external device. However, it should be noted that timing of acquiring information from an external device or timing of transmitting information to an external device is not necessarily in the charging state.

The non-combustion type flavor inhaler 20 includes a rechargeable battery 21. The rechargeable battery 21 accumulates electric power to drive the non-combustion type flavor inhaler 20. The rechargeable battery 21 is, for example, a lithium-ion battery.

The power feeding member 30 includes a power feeding unit 32. The power feeding unit 32 feeds electric power to the charging device 10 in a non-contact state. For example, the power feeding unit 32 includes a power feeding coil or the like to pass a current for generating an induced current in the power reception unit 12 by electromagnetic induction in a state in which the charging device 10 (power reception unit 12) is close to the power feeding member 30 (power feeding unit 32).

(Size)

In the following, the size of the charging device according to the embodiment will be described. FIG. 3 is a diagram for describing the size of the charging device 10 according to the embodiment.

Figure 3A:
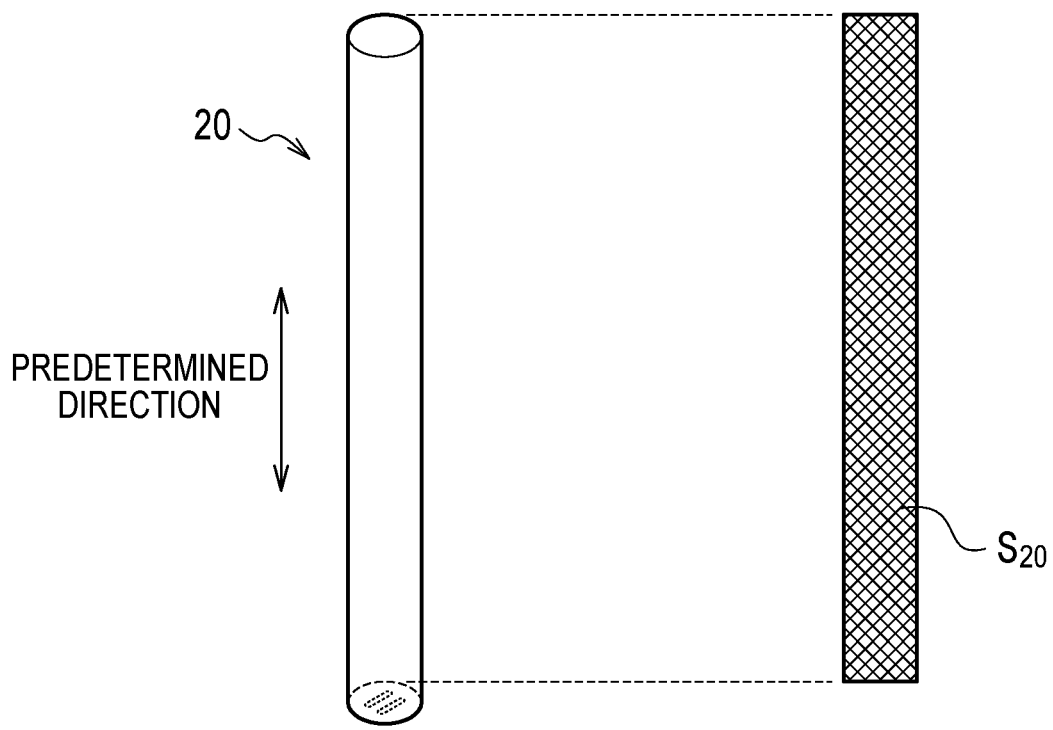
FIGS. 3A and 3B are diagrams for describing a size of the charging device 10 according to the embodiment.

As illustrated in FIG. 3A, the area of a projected part acquired by projection of the non-combustion type flavor inhaler 20 onto a predetermined projection plane is expressed by the area $S_{20}$. The predetermined projection plane is a plane having, as a perpendicular, a direction orthogonal to a predetermined direction. When the areas of the projected parts on various predetermined projection planes are different, the smallest area among the different areas is the area $S_{20}$.

For example, a case where the non-combustion type flavor inhaler 20 is a cylinder will be described as an example. When the length L of the cylinder in the predetermined direction is 125.5 mm and the cross section φ of the cylinder orthogonal to the predetermined direction is 9.2 mm, the area $S_{20}$ of the projected part is 9.2×125.5=1154.6 mm². Note that in a case where the non-combustion type flavor inhaler 20 is a cylinder, the areas of the projected parts on various predetermined projection planes are the same.

Figure 3B:
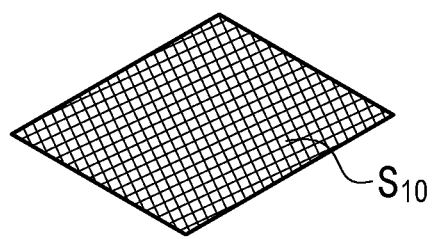

As illustrated in FIG. 3B, in a case where the charging device 10 is placed on the power feeding member 30, the area in which the charging device 10 is in contact with the power feeding member 30 is expressed by the area $S_{10}$.

In the embodiment, the housing 11 (recess 11A) of the charging device 10 holds the end part of the non-combustion type flavor inhaler 20. Also, it should be noted that the area $S_{10}$ is smaller than the area $S_{20}$.

Here, the area $S_{10}$ in which the charging device 10 is in contact with the power feeding member 30 needs to be larger than the size of the power reception coil included in the power reception unit 12. It should be noted that it is possible to sufficiently realize a configuration with the area $S_{10}$ being smaller than the area $S_{20}$ even in such a case, for example, in consideration of a power reception coil with the size of about 450 mm² being commercially available.

Furthermore, the area $S_{10}$ in which the charging device 10 is in contact with the power feeding member 30 and the area $S_{20}$ of the projected part acquired by projection of the non-combustion type flavor inhaler 20 onto the predetermined projection plane are larger than the size of an end surface of the non-combustion type flavor inhaler 20 (that is, surface on which electrode 20X is provided in embodiment). Thus, the size of the power reception coil included in the power reception unit 12 can be increased compared to a case where a power reception coil is provided in the non-combustion type flavor inhaler 20 without a change in the size of a cross section of the non-combustion type flavor inhaler 20 which section is orthogonal to a predetermined direction. In other words, the size of the cross section of the non-combustion type flavor inhaler 20 which section is orthogonal to the predetermined direction can be decreased as compared to a case where a power reception coil with a required size is provided in the non-combustion type flavor inhaler 20.

(Action and Effect)

In the embodiment, in a case where a non-contact power feeding system is applied to the non-combustion type flavor inhaler 20, it is possible to take advantage of the non-contact power feeding while controlling an increase in the size of the non-combustion type flavor inhaler 20 by using the charging device 10 including the power reception unit 12 without providing a power reception unit in the non-combustion type flavor inhaler 20.

In the embodiment, the housing 11 (recess 11A) of the charging device 10 holds the end part of the non-combustion type flavor inhaler 20 having a rod shape extending in a predetermined direction. Thus, compared to a case where the housing 11 of the charging device 10 holds a side face of the non-combustion type flavor inhaler 20, the charging device 10 can be downsized. Also, when the non-combustion type flavor inhaler 20 is used, the non-combustion type flavor inhaler 20 can be easily removed from the charging device 10.

In the embodiment, the area $S_{10}$ in which the charging device 10 is in contact with the power feeding member 30 is smaller than the area $S_{20}$ of the projected part acquired by projection of the non-combustion type flavor inhaler 20 onto a predetermined projection plane. That is, since the area occupied by the charging device 10 on the power feeding member 30 is small, a space to arrange a different device including a power reception unit can be easily secured on the power feeding member 30.

In the embodiment, since the charging device 10 includes the communication interface 14 to communicate with an external device, various kinds of information can be transmitted between the external device and the non-combustion type flavor inhaler 20 even when a communication interface to communicate with the external device is not provided in the non-combustion type flavor inhaler 20. Since it is not necessary to provide the communication interface in the non-combustion type flavor inhaler 20, it is possible to control an increase in the size of the non-combustion type flavor inhaler 20.

Different Embodiment

It should not be understood that the description and drawings included in a part of this disclosure limit the present invention although the present invention has been described with reference to the above-described embodiment. From this disclosure, various alternative embodiments, examples, and operational techniques will be apparent to those skilled in the art.

In the embodiment, an electromagnetic induction system has been described as an example of the non-contact power feeding system. However, the embodiment is not limited to this. For example, a non-contact power feeding system may be a magnetic field resonance system or an electric field resonance system. Alternatively, a non-contact power feeding system may be a radio wave receiving system.

INDUSTRIAL APPLICABILITY

According to the embodiment, a charging device that can take advantage of a non-contact power feeding system while controlling an increase in the size of a non-combustion type flavor inhaler is to be provided.

The invention claimed is:

1. A charging device for a non-combustion type flavor inhaler, comprising:
   a housing having a recess in a top surface and in which an electric contact with the non-combustion type flavor inhaler including a rechargeable battery is provided, wherein the recess is configured to hold only an end part of the non-combustion type flavor inhaler which has a rod shape extending in a predetermined direction and the housing is configured to not cover parts of the non-combustion type flavor inhaler other than the end part, and wherein the end part and the recess can be coupled via the electric contact by magnetism;
   a power reception unit configured to receive electric power in a non-contact state from a power feeding unit included in a power feeding member external to the charging device;
   a charging unit configured to supply the electric power received in the power reception unit to the rechargeable battery via the contact; and
   a control unit to control the charging device.

2. The charging device for a non-combustion type flavor inhaler according to claim 1, wherein in a case where the charging device is placed on the power feeding member, an area in which the charging device is in contact with the power feeding member is smaller than an area of a projected part acquired by projection of the non-combustion type flavor inhaler onto a plane perpendicular to a direction orthogonal to the predetermined direction.

3. The charging device for a non-combustion type flavor inhaler according to claim 1, further comprising a communication interface configured to communicate with the non-combustion type flavor inhaler and an external device.

4. The charging device for a non-combustion type flavor inhaler according to claim 3, wherein the communication interface includes a connection terminal to communicate with the non-combustion type flavor inhaler in a state in which the non-combustion type flavor inhaler is held by the housing.

5. The charging device for a non-combustion type flavor inhaler according to claim 3, wherein the communication interface is configured to acquire information related to the non-combustion type flavor inhaler from the non-combustion type flavor inhaler in a state in which the non-combustion type flavor inhaler is held by the housing.

6. The charging device for a non-combustion type flavor inhaler according to claim 1, wherein the power reception unit includes a power reception coil, and a size of the recess is smaller than a size of the power reception coil.

7. The charging device for a non-combustion type flavor inhaler according to claim 1, further comprising a base under the housing, a size of the base being larger than a size of a bottom surface of the housing.

8. The charging device for a non-combustion type flavor inhaler according to claim 7, further comprising a power cable attached to the base.

\* \* \* \* \*